(12) United States Patent
Verlinden et al.

(10) Patent No.: US 6,306,510 B1
(45) Date of Patent: Oct. 23, 2001

(54) LAMINATE COMPRISING A GLASS LAYER HAVING CRACK LINES

(75) Inventors: Bartholomeus Verlinden, Tongeren; Jean-Pierre Tahon, Langdorp; Leo Vermeulen, Herenthout, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/342,104

(22) Filed: Jun. 29, 1999

Related U.S. Application Data (60) Provisional application No. 60/100,126, filed on Sep. 14, 1998.

(30) Foreign Application Priority Data

Jul. 15, 1998 (EP) .................................................. 98202380

(51) Int. Cl.⁷ .................................................... B32B 17/06

(52) U.S. Cl. ............................... 428/426; 428/46; 428/48; 428/428; 428/432; 428/433; 428/410

(58) Field of Search ................................... 428/46, 47, 48, 428/49, 426, 428, 432, 433, 438, 410

(56) References Cited

U.S. PATENT DOCUMENTS

| | | |
|---|---|---|
| 1,219,853 * | 3/1917 | Okada . |
| 2,887,806 | 5/1959 | Hassett . |
| 4,774,143 | 9/1988 | Gondela et al. . |
| 5,558,827 | 9/1996 | Howes . |

* cited by examiner

Primary Examiner—Deborah Jones
Assistant Examiner—Abraham Bahta
(74) Attorney, Agent, or Firm—Breiner & Breiner, L.L.C.

(57) ABSTRACT

A laminate including a glass layer and a second layer, the glass layer having a pattern of crack lines, dividing the glass layer into pattern elements.

18 Claims, 3 Drawing Sheets

LAMINATE COMPRISING A GLASS LAYER HAVING CRACK LINES

This application claims benefit to Provisional application No. 60/100,126 filed Sep. 14, 1998.

FIELD OF THE INVENTION

The present invention relates to a laminate comprising a glass layer and a second layer.

More specifically the invention is related to a laminate comprising a glass layer and a polymer layer.

BACKGROUND OF THE INVENTION

Patent application WO 99/21707 discloses a laminate having at least one glass layer as a constituting layer, the glass layer having a thickness of less than 4 mm. Such a laminate presents several advantages over e.g. transparent polymer layers, such as a high thermal stability, a high physical density, high hardness, very good resistance to chemicals, good barrier properties against moisture, solvents and oxygen. Moreover, glass has a high transparency and good optical characteristics.

However, a problem of such a laminate is its limited flexibility. Due to the brittleness of glass, the laminate cannot be deformed to a considerable extent, especially if the glass has a rather large thickness, e.g. larger than 1 mm, or if the deformed glass has a small radius of curvature. Even very thin, and hence flexible glass layers may break.

It would be advantageous to use such a glass laminate for the production of security cards. Because of the high physical density of glass, an original security card comprising a glass laminate can be distinguished from a counterfeited plastic card, by measuring the density of the card. However, a security card comprising such a glass laminate may break easily, e.g. when put away in a wallet in a trouser pocket.

It would also be advantageous to use such a glass laminate for making photomasks, that can e.g. be used to manufacture printed circuit boards, semiconductor devices, integrated circuits. Prior art masks having a polymer support suffer from insufficient dimensional stability, due to environmental changes in temperature and/or humidity. A glass layer support provides the important advantage of a high dimensional stability. However, a photomask comprising such a glass laminate may break e.g. during manipulation, due to its low flexibility.

OBJECTS AND SUMMARY OF THE INVENTION

It is an object of the present invention to provide a laminate that comprises a glass layer and that has an improved flexibility.

It is another object of the invention to provide a laminate that preserves advantages of prior art laminates comprising a glass layer.

These objects are realised by a laminate having the specific features as claimed. Specific features for preferred embodiments of the invention are also claimed. The above mentioned objects are also realised by a method, comprising the steps as claimed.

It is yet another object of the present invention to provide a security card having a high physical density and good flexibility. This object is realised by a security card, having the specific features as claimed.

It is still another object of the present invention to provide a material for making a photomask having a high dimensional stability and good flexibility. This object is realised by a laminate, having the specific features as claimed.

It is yet another object of the present invention to provide a method for making a deformed laminate, the method allowing very large deformations in three dimensions. This object is realised by a method, comprising the steps as claimed.

Some terms used in the claims are defined below.

A "crack line" in a glass layer stands for a long, narrow opening in the glass layer surface (see e.g. FIG. 1, crack lines 11 in glass layer 10), the opening being made in a controlled way, i.e. so that the properties of the crack lines, e.g. their number, their width, their depth, etc. are known before the crack lines are made. An occasional break is not a crack line. A crack line can start and end at an edge of the glass layer, at another crack line, or at an arbitrary position on the glass layer surface. The depth of a crack line is smaller than or equal to the glass layer thickness; a crack line has a nonzero minimum depth, as is discussed hereinafter. A crack line can have zero width, as a special case (a crack line having zero width can e.g. be created by cutting the glass layer, thus splitting it into two glass layer portions with a narrow opening in-between, and by subsequently closing the opening by moving the first portion until it contacts the second portion). The edges of the cross section of a crack line may be sharp or rounded; the cross section may have rounded edges at the "bottom" side of the crack line, e.g. a cross section may have a U-shape, or the cross section may have rounded edges at the "top" side opposite to the bottom side, or some edges of the cross section may be sharp and other edges may be rounded.

Figures 3A, 3B, 3C, 3D, 3E, 3F:
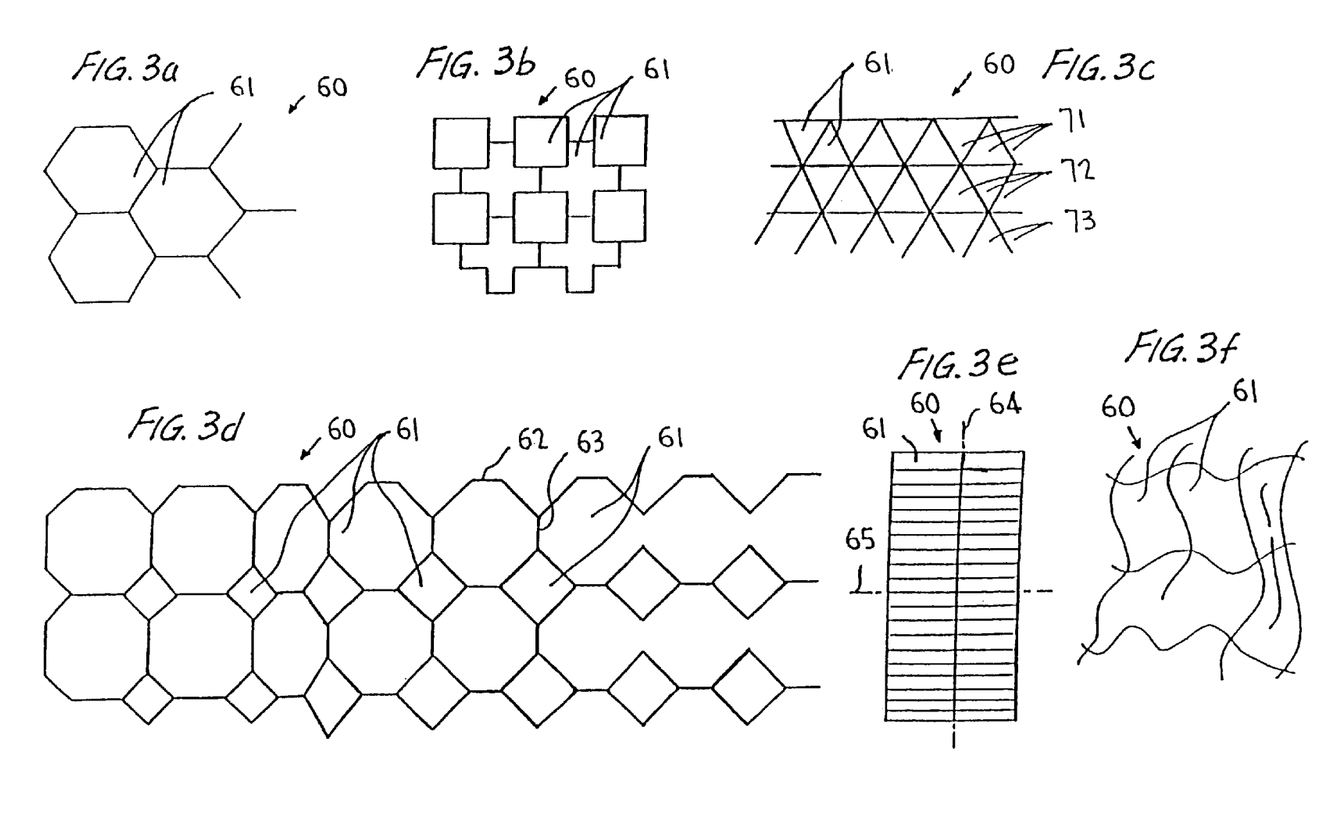
FIG. 3 shows some possible patterns into which crack lines in a glass layer may be arranged.

A "pattern" is formed by a set of crack lines on a surface. A "pattern element" is an entity that is completely enclosed by these crack lines and possibly by the edges of the surface. As an example, the pattern elements in FIG. 3a are hexagons. A pattern element may comprise one or more crack lines starting and ending within the enclosure of the pattern element, or starting on the edge of the pattern element and ending within the enclosure of the pattern element; both cases are illustrated in FIG. 3f. A pattern element has a "pattern element size", defined as being calculated from the area of the pattern element as follows: size=$\sqrt{area/\pi}$ (in fact, the pattern element size equals the radius of a circle having the same area as the pattern element. As an example, for a pattern of squares with side c, the pattern element size is $c/\sqrt{\pi}$).

In a preferred embodiment, one or more glass layers in the laminate comprise a number of portions that have crack lines, and a number of portions that have no crack lines. Thus, some portions of the laminate may have an improved flexibility (as explained below), while other portions may have the flexibility of prior art laminates. In this case, the maximum pattern element size of the laminate is defined as the maximum pattern element size of the portions of the glass layers having crack lines.

When deforming a laminate comprising a glass layer having crack lines, the glass layer does not act as a uniform layer having a high stiffness, determined by its material properties and its thickness. Instead, the individual pattern elements can move about the crack lines. In this way, a laminate comprising a glass layer and having a high flexibility is obtained. This is discussed more in detail hereinafter.

A laminate according to the present invention preserves advantages of prior art laminates comprising a glass layer, and offers an improved flexibility.

Further advantages and embodiments of the present invention will become apparent from the following description and drawings.

BRIEF DESCRIPTION OF THE DRAWINGS

The invention is described hereinafter by way of example with reference to the accompanying figures, wherein.

DETAILED DESCRIPTION OF THE INVENTION

Figure 1:
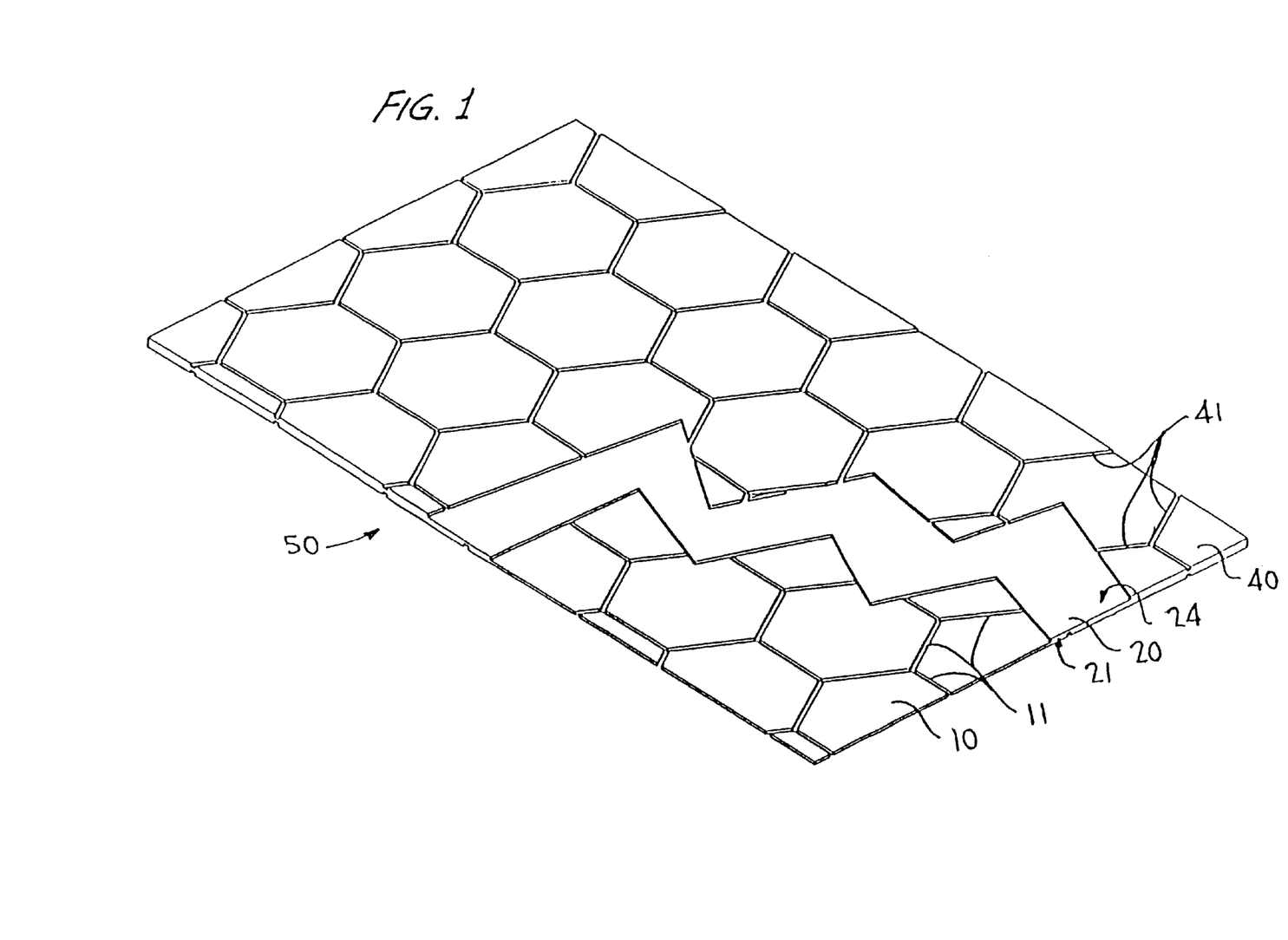
FIG. 1 shows a first embodiment of a laminate in accordance with the present invention.

FIG. 1 shows an embodiment of a laminate 50, comprising a glass layer 10, a second layer 20 and an additional glass layer 40. Only a rectangular portion of the laminate is shown, cut from e.g. a larger strip. For clarity, the second layer 20 and the additional glass layer 40 are partly cut away in the drawing. The glass layer 10 is laminated to the surface A (21) of the second layer 20, and the additional glass layer 40 is laminated to the surface B (24), that is Opposite to the surface A (21), of the second layer 20. Both the glass layer 10 and the additional glass layer 40 have crack lines 11 resp. 41. In FIG. 1, the crack lines are arranged in a hexagonal pattern and have a depth equal to the thickness of the respective glass layers.

Thus, when deforming the laminate 50, e.g. when bending it, the glass layer does not act as a uniform layer having a high stiffness, determined by its material properties and its thickness. Instead, the individual hexagons can move about the crack lines. Especially when the hexagonal elements are small enough, the flexibility of the laminate is determined mainly by the flexibility of the second layer 20, which may e.g. be a polymer layer. In this way, a laminate 50 comprising a glass layer and having a high flexibility is obtained.

Figure 2:
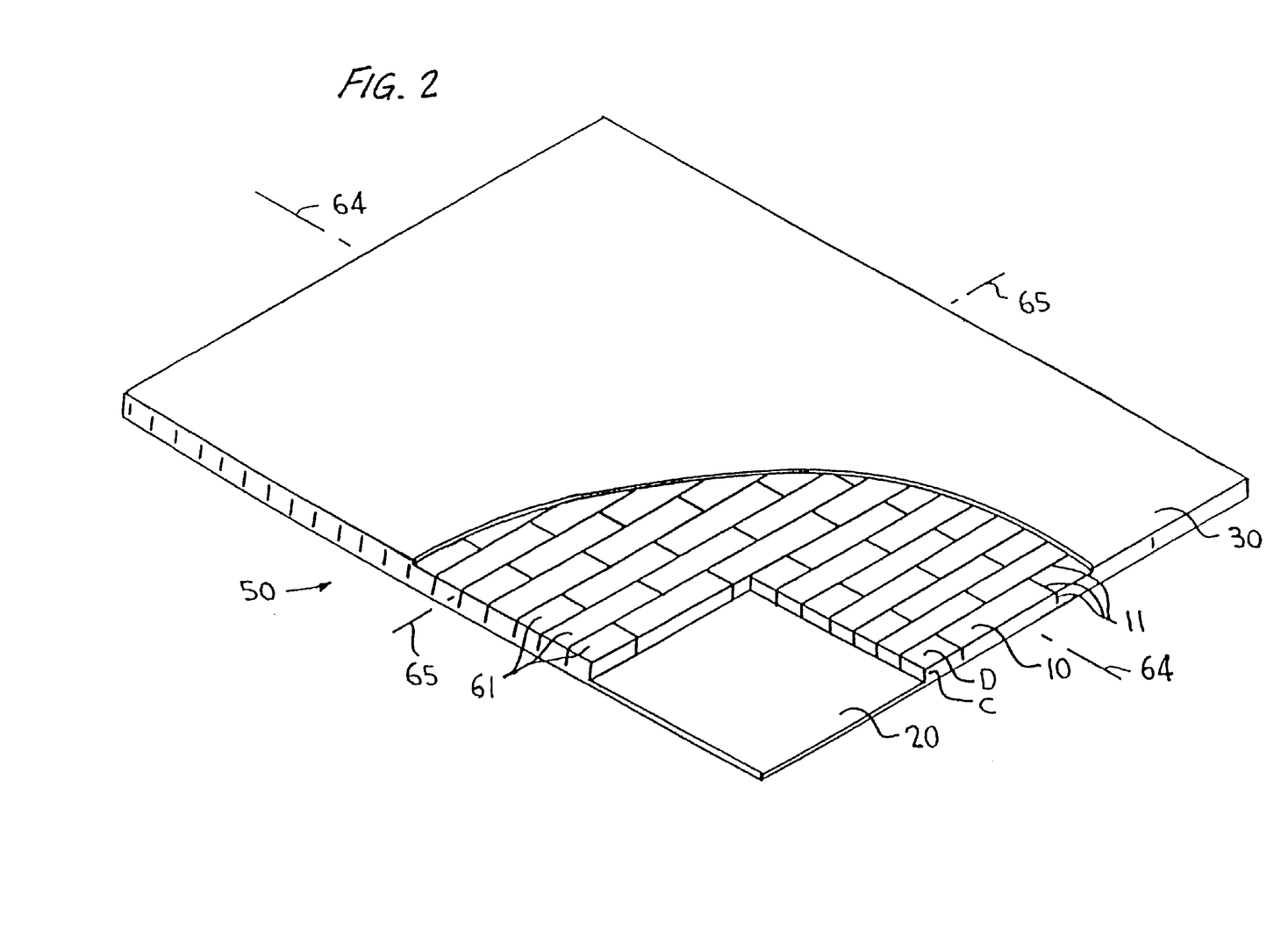
FIG. 2 shows a second embodiment of a laminate in accordance with the present invention.

FIG. 2 shows another embodiment, comprising a glass layer 10, a second layer 20 and a third layer 30. Only a rectangular portion of the laminate is shown, cut from e.g. a larger strip. For clarity, the glass layer 10 and the third layer 30 are partly cut away in the drawing. The second layer 20 is laminated to the surface C of the glass layer 10, and the third layer 30 is laminated to the surface D of the glass layer 10 that is opposite to the surface C. The crack lines 11 in the glass layer 10 are arranged in a brick-like pattern. The crack lines 11 have zero width and are therefore shown by single lines—whereas the crack lines 11 and 41 in FIG. 1, having a nonzero width, are shown by two substantially parallel lines.

As discussed hereinafter, the second layer 20 and the third layer 30 preferably comprise an organic resin, e.g. a polymer. In a highly preferred embodiment according to the invention, glass elements 61 (see FIG. 2), that form a pattern in the glass layer 10, are embedded in flexible polymer layers. Since the glass pattern elements 61 may move about the crack lines 11, 41, a flexible laminate is obtained, and uncontrolled breaking of the glass is avoided. This solves the problem of prior art glass laminates.

A laminate 50 in accordance with the present invention may be produced as follows. First, a second layer 20 is laminated onto glass layer 10. Next, a pattern is scratched into the surface of the glass layer, by means of a hard cutting tool, preferably a diamond. Optionally, a third layer 30 is laminated onto the glass layer 10, thus obtaining a laminate 50 as shown in FIG. 2. Subsequently, the glass layer 10 is broken in a controlled way along the pattern scratched into its surface, e.g. by letting the laminate follow a curved path around a portion of the surface of a cylindrical roller. Such a curved path induces bending stresses into the glass layer, that cause the scratches to propagate through the entire thickness of the glass layer, thus forming crack lines 11.

The crack lines 11 may also be cut into the glass layer 10 by means of a laser, or by other methods as known in the art. In one production method, first a second layer 20 is laminated onto glass layer 10, and subsequently the crack lines 11 are directly cut into the glass layer 10, e.g. by means of a laser. After cutting, a third layer 30 may be laminated onto the glass layer 10, to obtain a laminate 50 as shown in FIG. 2. In another production method, two glass layers 10 and 40 may be laminated onto a layer 20, as shown in FIG. 1, and crack lines may be created in both glass layers, e.g. by laser cutting.

Lamination of two or more layers may be carried out in a known manner by applying an adhesive layer or tape or a glue between the layers, and by applying heat and/or pressure thereto, as described in patent application WO 99/21707, mentioned hereinbefore.

Optionally, a post-curing production step of an adhesive layer may be carried out in the embodiment shown in FIG. 1, with a second layer 20 that comprises an organic resin. In such a step, organic resin penetrates into the crack lines. The organic resin may fill the crack lines partly or completely, depending upon the type of organic resin, the temperature, the duration of the post-curing step.

Optionally, a glass layer may get a chemical treatment such as etching, or a thermal or mechanical treatment such as grinding.

Preferably, a laminate in accordance with the present invention is produced in a continuous production method. The glass may be provided on roll and may be unwound from the roll to carry out the successive production steps as mentioned above. A batch process may also be used, but this is inherently more expensive and has a higher complexity than a continuous production method.

In a laminate according to the present invention, the glass layer 10 preferably has a thickness of less than 4 mm. A glass layer (not yet comprising crack lines) that is suitable as a basic product for the present invention is described in EP-A-0 716 339. A preferred glass layer is characterised by a failure stress (under tensile stress) higher than $1 \times 10^7$ Pa, an elasticity modulus (Young's modulus) lower than $1 \times 10^{11}$ Pa and a thickness preferably not higher than 1.2 mm, more preferably lower than 0.5 mm, even more preferably lower than 0.3 mm and most preferably lower than 120 $\mu$m.

Glass according to the above specifications is commercially available from Desag, a Schott group company, as types AF45 and D263 with a thickness ranging from 30 $\mu$m to 1.1 mm and from Corning as types 7059F and 1737F with a thickness of 0.7 mm and 1.1 mm. The glass layer is preferably made of sodium silicate or borosilicate but chemically strengthened glass can also be used. Chemically strengthened glass is glass wherein the original alkali ions near both surfaces are at least partially replaced by an alkali ion with a larger radius. At the surface of strengthened sodium lime silica glass, sodium is replaced at least partially by potassium, and at the surface of strengthened lithium lime silica glass, lithium is replaced at least partially by sodium. More details about chemical strengthening of glass are i.a. given in the journal "Glass Technology", Vol. 6, No. 3, page 90–97, June 1965. Thin, chemically strengthened glass, the use thereof and a process for producing it are disclosed in European patent application EP-A-0 875 490.

In a preferred embodiment, the second layer 20 comprises paper, metal or both; in case metal is present, a thin metal layer is preferred, that still has a reasonably high flexibility. In a more preferred embodiment, the second layer 20 comprises an organic resin, as described in patent application WO 99/21707 mentioned hereinbefore, e.g. cellulose acetate film, poly(vinyl acetal) film, polystyrene film, polycarbonate film, or poly(ethylene terephthalate) film, polyethylene film, polypropylene film, a copolymer of acrylonitrile, styrene and butadiene.

In a preferred embodiment, the third layer 30 comprises paper, metal, or both; more preferably, the third layer 30 comprises an organic resin, as described in patent application WO 99/21707 mentioned hereinbefore.

In a preferred embodiment, the glass layer 10 may be used as a support for carrying one or more functional layer(s) on one or on both sides, e.g. in image recording materials, receiving materials in non-impact printing, as support for colour filters or conductive layers in flat panel displays such as LCD's, etc. Since the glass on roll is flexible as well as mechanically strong, it may be unwound from its core without breaking and can be provided with a functional layer in a continuous process, e.g. by using a web coater. "Continuous" coating refers to the coating of a layer on a support in web-form, contrary to the coating of individual sheets. After coating and drying, the coated glass can be cut into sheet materials or it may be kept in roll form. Forming the crack lines, as described hereinbefore, may occur before or after application of the functional layer(s). In another production method, one or more functional layer(s) may be applied before the crack lines are formed, and one or more additional functional layer(s) may be applied after the crack lines are formed.

EP-A-716 339, mentioned hereinbefore, discloses a method for continuously coating glass on roll with a functional layer. The coating can proceed by sputtering, as disclosed e.g. in WO 87/00982, by physical vapour deposition, by chemical vapour deposition, by lamination of a functional layer (optionally using an adhesive layer) via a material comprising said functional layer on a temporary support as well as by coating from a liquid coating solution by dip coating, rod coating, blade coating, air knife coating, gravure coating, reverse roll coating, extrusion coating, slide coating and curtain coating. An overview of these coating techniques can be found in "Modern Coating and Drying Technology", Edward Cohen and Edgar B. Gutoff Editors, VCH publishers, Inc, New York, N.Y., 1992. A plurality of layers may be coated simultaneously on glass on roll produced by the process of this invention, e.g. by coatings technique such as slide coating or curtain coating.

Before coating the functional layer, the surface on one or both sides of the rolled glass can be pre-treated, e.g. can be etched or pre-coated with a subbing layer for a good adherence to the functional layer. Particularly suitable subbing layers for said purpose are on the basis of silicon containing compounds, e.g. those described in U.S. Pat. No. 3,661,584 and GB 1 286 467. Said compounds may also be added to the coating composition of the functional layer. Glass produced in a process according to this invention, can further be coated with a silicate sol/gel coat having preferably a thickness below 100 $\mu$m, more preferably a thickness below 20 $\mu$m. Said sol/gel coat is preferably sodium free, such as a boro silicate sol/gel coat, especially when the glass is used for LCD application, e.g. for being provided with an indium-tin oxide (ITO) layer.

A preferred example of a functional layer which may be coated on the glass support of the present invention is an image recording layer such as a light sensitive or heat sensitive layer. The glass support of the present invention is especially suited for use in image recording materials which require high dimensional stability, e.g. for graphic image-setting or for producing printing plates, such as lithographic pre-sensitised plates, monosheet diffusion transfer reversal (DTR) plates, driographic plates, thermal plates, etc. The light-sensitive compositions of pre-sensitised plates typically contain diazo compounds and can roughly be divided in negative-working types and positive-working types. The negative-working compositions comprise light-sensitive diazo compounds and preferably polymeric compounds. As the diazo compounds used in a positive-working composition, any compounds conventionally known may be utilised and typical examples thereof are o-quinonediazides and preferably o-naphthoquinonediazide compounds. These o-quinonediazide compounds may be used alone, but are preferably used as a mixture with an alkali-soluble resin to form a light-sensitive layer.

Typical examples of light sensitive materials, which may comprise glass of the present invention as a supporting layer, are silver halide photographic materials consisting of at least one aqueous hydrophilic layer containing silver halide crystals. The composition of silver halide emulsion layers and auxiliary layers is described in e.g. Research Disclosure no. 17643 of December 1978 and Research Disclosure no. 307105 of November 1989. Various embodiments of colour photographic materials are described in Research Disclosure no. 308119 of December 1989.

The material comprising the glass of the present invention may further comprise a hydrophilic layer formed of a hydrophilic binder which is cross-linked with an agent such as formaldehyde, glyoxal, polyisocyanate or preferably a hydrolysed tetra-alkylorthosilicate. Further particular examples of suitable cross-linked hydrophilic layers are disclosed in EP-A 601 240, GB 1 419 512, FR 2 300 354, U.S. Pat. Nos. 3,971,660, 4,284,705 and EP-A 514 490.

Heat-mode or thermosensitive image recording materials also benefit from having glass of the present invention as a support because of the higher thermal stability compared to plastic supports consisting of organic polymers. Preferred thermosensitive layers require no wet processing so as to obtain dry imaging materials, e.g. DRAW materials (Direct Read After Write), heat-processable materials such as the so-called Dry Silver materials or materials for COM-production (Computer Output on Microfilm) as described in e.g. Journal of Applied Photographic Engineering, Vol. 9, No. 1, p. 12 (February 1983). A survey of metal layers suited for use as image recording layer in DRAW heat-mode recording is given in U.S. Pat. Nos. 4,499,178 and 4,388, 400. For the production of optical discs wherein the information is read in reflection mode, a thermosensitive recording layer having low reflectivity may be applied on a relatively high reflective layer such as an aluminium layer.

Thin metal layers are preferably applied by vacuum deposition techniques. In a preferred embodiment of a heat-mode recording material, which comprises glass of the present invention, a thin vacuum deposited layer of bismuth (Bi) is used as the heat-mode recording layer. Bi is characterised by a low toxicity and forms films with ease by vapour deposition under vacuum conditions. Said Bi film may be image-wise ablated or fused into small particles with a low amount of energy. Such a Bi layer is preferably protected against scratches, dust, etc., by a protective layer which may applied by coating from a liquid solution, spraying or by laminating a protective organic resin layer in web form, by means of an adhesive layer and in the same vacuum environment as wherein the Bi layer is vacuum deposited, to said Bi layer as described in EP-B-384 041.

In a further embodiment heat-mode recording is carried out with binderless organic dye layers as described e.g. in the periodical Philips Techn. T. 41, p. 338–346 by D. J. Gravesteijn and J. van der Veen. In still another application the image recording layer is a photochromic layer as described in Chapter 8 of "Imaging Systems", K. I. Jacobson and R. E. Jacobson, Focal press (1976) p. 143 et seq. The image recording layer may also be a photodelamination layer as described in Research Disclosure no. 22202 (October 1982), p. 328–329. Several printing methods may also benefit from the use of glass of the present invention, e.g. as an image receiving layer. Examples of such printing methods are electrophotographic (laser) printing, ink jet, toner jet, dye diffusion transfer, thermal wax printing, flexographic printing and screen printing.

Thin, chemically strengthened glass as described hereinbefore is especially well suited for use in the production of colour flat panel displays comprising multi-colour filters as disclosed in e.g. EP-B 396 824 and EP-A 615 161. In addition to the low weight and high thermal stability, the optical isotropy of glass is another advantage in this application, compared to most polymer films which are optically anisotropic and, as a result, show birefringence. For use as flat panel display colour filter the glass may be coated with at least three silver halide emulsion layers, each being sensitive to light of a different wavelength range.

Also non-imaging layers can be applied to the glass of the present invention. Examples of such layers are adhesive layers, magnetic layers, hard-coat layers, pigment layers, thermo-adhesive layers, UV-absorbing layers, thermoplastic layers, etc. The glass on roll of the present invention is very well suited as a light weight, thermally stable, transparent support needed in flat panel displays such as LCD's, e.g. for carrying liquid crystal orientation layers or electroconductive layers such as ITO or as support of electronic components such as thin-film transistors or pixel electrodes. For the application of such electronic components on regular sheet glass, silk screen printing is typically used, but glass on roll enables the use of faster and more reliable printing techniques such as offset printing.

A laminate wherein the depth of the crack lines equals the glass layer thickness may be provided via scratching and controlled breaking, or via laser cutting (both production methods are described above). To obtain crack lines having a depth smaller than the glass layer thickness, laser cutting may be used.

Preferably, the crack lines have a depth equal to the glass layer thickness, so that the flexibility of the laminate is mainly determined by the second layer and, if present, by the other layers. However, if desired, the crack line depth may be smaller than the glass layer thickness, so that the flexibility of the laminate is also determined by the glass layer. In this way, a higher stiffness can be obtained. This is especially useful if the laminate comprises a thick glass layer and one or more thin non-glass layers, and if the desired stiffness is higher than the—low—stiffness of the thin non-glass layers. If a glass layer breaks that has crack lines with a depth smaller than the glass layer thickness, it will break in a controlled way, along the crack line, which is advantageous with respect to uncontrolled breaking.

The depth of the crack lines is preferably at least 10% of the glass layer thickness, more preferably at least 20%, even more preferably at least 50%, most preferably at least 90%. Different crack lines may each have a different depth, e.g. the depth of a first crack line may be 70%, the depth of a second crack line 90%, and the depth of a third crack line 100% of the glass layer thickness. A crack line may have a varying depth, varying e.g. from 50% of the glass layer thickness at the start of the crack line, to 90% at the end of the crack line.

Preferably, a crack line having a depth smaller than the glass layer thickness has a "rounded" cross section, i.e. the edges of the cross section of the crack line are rounded, having e.g. a U-shape. When a force is applied to the laminate, such crack lines having rounded cross sections will break less easily than crack lines having sharp-edged cross sections.

The width of the crack lines can be zero, e.g. in case of production by scratching and controlled breaking. The crack line width is preferably less than 1 mm, more preferably less than 0.5 mm, most preferably less than 0.1 mm. Two different crack lines may each have a different width, e.g. a first crack line may have a width of 0.2 mm and a second crack line a width of 0.1 mm. A crack line may have a varying width, varying e.g. from 0.2 mm at the start of the crack line, to 0.05 mm at the end of the crack line.

FIG. 3 shows some possible pattern elements 61, forming patterns 60, into which the crack lines 11 in a glass layer 10 of a laminate 50 may be arranged. The patterns 60 shown in FIG. 3 comprise respectively: in FIG. 3a regular hexagons, in FIG. 3b squares and crosses, in FIG. 3c triangles, in FIG. 3d octagons and diamonds, in FIG. 3e rectangles, in FIG. 3f arbitrary shapes.

As shown in FIG. 3d, the pattern 60 may vary over the surface of the glass layer 10: in the left portion of FIG. 3d, the pattern comprises small diamonds and large octagons, while the middle portion comprises larger diamonds and smaller octagons. The right portion of FIG. 3d shows diamonds connected by portions of straight lines; the sides of the octagons parallel to side 63 are left out. This results in a difference in flexibility of the laminate 50, when it is bent about a line parallel to side 63 respectively about a line perpendicular to side 63 (i.e. parallel to side 62). This is clarified in FIG. 3e.

FIG. 3e shows a rectangular pattern. When bending the laminate 50 about axis 64, lines parallel to axis 64 remain substantially straight, while lines perpendicular to axis 64 get curved. When bending about axis 64, flexibility is lower than when bending about axis 65, perpendicular to axis 64. This is because the rectangular pattern has, per unit length, less crack lines parallel to axis 64 than parallel to axis 65. Suppose that there would be no crack lines at all parallel to axis 64; when bending about axis 64, the flexibility of the laminate 50 would be very low, namely substantially equal to the flexibility of a laminate without any crack lines.

FIG. 3f shows an arbitrary pattern. As illustrated, a crack line does not always start on another crack line or on an edge; a crack line may start at an arbitrary point.

Another pattern, not shown, comprises broken lines.

Which pattern is preferred, depends upon the application and upon the properties of the second layer 20 and of the other nonglass layers (if present). In an embodiment wherein the second layer and the other non-glass layers (if present) are very thin and flexible, a continuous, straight crack line in the glass layer 10 will result in a fold when bending about this crack line. Thus, to avoid folds, in such a case a pattern without continuous straight lines is normally preferred (unless folds are desired in the application, of course). As an example, a pattern having curved lines, as shown in FIG. 3f, may be used. In another embodiment, wherein the second layer 20 and the other non-glass layers (if present) have a larger thickness and a higher stiffness, continuous straight crack lines in the glass layer 10 will not result in folds. In this embodiment, often preferred are a rectangular pattern, as shown in FIG. 3e, and even more a brick-like pattern, as shown in FIG. 2. In case of a laminate 50 having a rectangular shape, as shown in FIG. 2, the orientation of the brick-like pattern is preferably so that a larger number of crack lines per unit length are substantially parallel to the short side of the laminate, while a smaller number of crack lines per unit length are substantially parallel to the larger side of the rectangle, as shown in FIG. 2. In this way, the flexibility of the laminate 50 is higher when it is bent about axis 65 than about axis 64, as explained in the discussion of FIG. 3e. Referring to FIG. 2, a higher flexibility about axis 65, substantially perpendicular to the larger side of the rectangular laminate, is generally preferred in many applications. If the laminate 50 is e.g. used as a (rectangular) security card, the owner of the card may occasionally bend it; he will very probably bend it about axis 65, since he will apply forces on the extremities of the larger side of the card, and not on the shorter side. Therefore, a higher flexibility about axis 65 is preferred.

A highly preferred pattern is a triangular pattern. A triangular pattern may comprise equilateral triangles, as shown in FIG. 3c, and/or irregular triangles. By varying the pattern element size and/or the orientation of the triangles, the flexibility of the laminate can be controlled. In case of a laminate comprising two glass layers, such as the laminate shown in FIG. 1, the majority of the sides of the triangles in the first glass layer 10 may be parallel to the sides of the triangles in the second glass layer 40, thus providing a higher flexibility; alternatively, the majority of the sides of the triangles in the first glass layer 10 may not be parallel to the sides of the triangles in the second glass layer 40, thus providing a lower flexibility.

Generally, the purpose of the pattern is to provide a high flexibility, while avoiding folds and uncontrolled breaking.

The maximum pattern element size, i.e. the size of the element that has the largest pattern element size, is in a preferred embodiment smaller than 5 mm, preferably smaller than 1 mm, more preferably smaller than 0.5 mm. A small pattern element size is advantageous, because a laminate 50 can be obtained that has a high flexibility and that exhibits a homogeneous behaviour. Concerning high flexibility, for a laminate 50 that comprises small pattern elements and that has crack lines with a depth equal to the glass layer thickness, the flexibility of the laminate is determined mainly by the flexibility of the second layer 20 and—if present—of the other layers, all of which may e.g. be flexible polymer layers. It is clear that the small pattern elements of the glass layer, separated from each other by crack lines, only have a very small contribution to the stiffness of the laminate. Concerning homogeneous behaviour of the laminate 50, such a behaviour is obtained because a relatively small portion of the laminate already comprises a large number of pattern elements and of crack lines.

Thus, the difference in e.g. mechanical, electrical, thermal properties of the pattern elements on the one hand, and of the crack lines on the other hand, is being averaged when the laminate is e.g. subjected to mechanical, electrical, thermal phenomena.

The present invention is not limited to the embodiments disclosed hereinbefore.

The laminate may comprise two glass layers, as described hereinbefore, or more than two glass layers. In a preferred embodiment, each glass layer has crack lines. In another preferred embodiment, one glass layer, preferably the glass layer with the largest thickness, has crack lines, and the other glass layers have no crack lines. In yet another embodiment, two or more glass layers have crack lines, and the other glass layers have no crack lines.

In case at least two glass layers have crack lines, the patterns of the crack lines in these glass layers may be the same (e.g. all patterns are triangular), or they may be different (e.g. a triangular pattern in a first glass layer and a hexagonal pattern in a second layer, or a triangular pattern in a first and in a second layer, and an arbitrary pattern in a third layer).

A laminate product, that is ready to be used (e.g. a security card), may have a rectangular shape; it may have the shape of a rectangle with rounded corners; it may have a circular shape; it may have an arbitrary shape. Generally, the laminate product will be cut from a large laminate strip—e.g. wound on a roll—that is produced as disclosed hereinbefore.

Applications

An application of a laminate in accordance with the present invention is a security card. Such cards are customarily made of plastic. An advantage of a security card comprising a laminate in accordance with the present invention is its high physical density, when compared to a card made of plastic. Thus, by measuring the density, an original security card can be distinguished from a counterfeited plastic card. An embodiment of a security card is described hereinafter, under the heading "Example". The security card in the example comprises layers of poly(ethylene terephtalate), polyethylene, borosilicate glass and polyvinylchloride. Instead of poly(ethylene terephtalate) and polyethylene, other polymer layers may be used, such as a polycarbonate layer having a layer with a high scratch resistance at its outer side (i.e. at the outside surface of the security card). The imaging layer, that will generally comprise an image of the owner of the card, may comprise a diffusion transfer reversal (DTR) layer; in other embodiments, the imaging layer comprises a laser writeable layer resp. an inkjet layer. The security card may comprise one or more additional security elements, e.g. a hologram, a magnetic strip, a bar-code, U.V. printing, iridescent printing, optical laser recording; all these techniques are known by one skilled in the art.

Another advantage of a security card comprising a laminate in accordance with the present invention is the improved flexibility of the card, so that the card will not easily break when it is manipulated or when it is put away. Yet another advantage is that the pattern formed by the crack lines can be seen in sidelight when the card is bent slightly; thus, the presence of the pattern is an extra safety feature, allowing the card to be distinguished from a counterfeited card.

Another application of a laminate in accordance with the present invention is based on deformation of the laminate. As an example, a laminate comprising organic resin layers can be deformed in three dimensions at a temperature above the glass transitional temperatures $T_g$ of the organic resin layers, without bringing the glass layer into a viscous state. Thus, very large deformations become possible. The laminate may be deformed by bending; alternatively, it may be pressed in a mould. After cooling the deformed laminate to room temperature, the deformed product thus exhibits a large deformation and is, preferably, stress-free. The deformed product may have a radius of curvature of less than 20 mm; such a radius of curvature is not attainable for a glass laminate having no crack lines. A field of application of such laminates exhibiting a large deformation is the automotive industry; this industry often necessitates complex shapes.

A first example of a deformed laminate is a laminate wherein the deformation is used for mounting the laminate. As an example, the laminate may comprise a first, middle portion having one or more glass layer(s) without crack lines, and a second portion and a third portion that both have one or more layer(s) with crack lines; the second portion is at the left hand side of the first, middle portion and the third portion is at the right hand side of the first, middle portion. The first, middle portion is the functional portion of the laminate: it is not deformed, and it fulfils the function of the laminate, which is e.g. a transparent barrier against air and moisture. The second and the third portion exhibit a large deformation, e.g. an arcuate deformation over an angle of 180° and with a radius of curvature of 5 mm. The second and the third portion are used for mounting the laminate into the assembly to which it belongs. Instead of an arcuate shape, the second and the third portion may also have another, more complex shape. An advantage of such a deformed laminate is that no extra parts, or, at least, that less parts are required for mounting the laminate, since mounting is integrated into the laminate. In another embodiment, all portions of the laminate have crack lines, but only the portions for mounting the laminate exhibit a large deformation.

A second example of a deformed laminate is a window glass. The window glass may be used as car glass, in buildings, etc. The window glass may comprise one or more portion(s) having a glass layer with crack lines; preferably, these portions are the portions of the window glass that exhibit a deformation. Alternatively, all portions of the window glass may comprise crack lines. An advantage is that window glasses with complex shapes become possible, which offers new possibilities in architecture and in design.

Yet another application of a laminate in accordance with the present invention is concerned with optics. If the crack lines in the glass layer have a nonzero width and are filled with an organic resin (as is the case for the embodiment, described hereinbefore, in which a post-curing production step is used), then preferably the refractive index $n_g$ of the glass and the refractive index $n_{or}$ of the organic resin are substantially equal. In a preferred embodiment, the refractive indices of all the glass layers and all the organic resin layers of the laminate are substantially equal. A set of two or more refractive indices are substantially equal, if the difference $n_{max}-n_{min}$ between the largest index of the set, $n_{max}$, and the smallest index of the set, $n_{min}$, is not higher than 0.2, preferably lower than 0.1, more preferably lower than 0.05, even more preferably lower than 0.02 and most preferably lower than 0.01. Preferably, the refractive index n mentioned above is the refractive index at a wavelength of 589 nm, i.e. at the wavelength of the sodium D-line. For type AF45 glass, available from Desag, and having a refractive index n=1.5255, among others the following polymers (or organic resins) are preferred: a copolymer of polystyrene and acrylonitrile butadiene styrene (n=1.52), polyethylene (n=1.51), a copolymer of poly(methyl methacrylate) and acrylonitrile (n=1.51).

If materials in the same layer (such as glass on the one hand and organic resin in the crack lines on the other hand) have substantially equal refractive indices, a first advantage is that little or no image distortion results when light is transmitted through this layer. This is also an advantage in the case of the window glass mentioned above. A second advantage is that there will be little or no reflection, at the boundaries between the different materials, of light that incidents obliquely upon the layer.

Further, if subsequent layers in a laminate have substantially equal refractive indices, an advantage is that there will be little or no light reflection at the boundaries between the layers.

A laminate in accordance with the present invention, and preferably having the above optical properties, may be flexible and/or may have a complex shape. For example: a flexible laminate may be obtained by the use of thin glass and polymer layers; a laminate having a complex shape may be obtained by the deformation method described above; a laminate that has a complex shape and a high flexibility may be obtained by deforming a laminate of thin layers.

Still another application of a laminate in accordance with the present invention is based on reorientation of the pattern elements in a glass layer of the laminate. An example is a laminate that is originally oriented along a flat plane, hereinafter called "the reference plane", and that comprises a glass layer with crack lines arranged in a triangular pattern, as shown in FIG. 3c. This laminate may be deformed such that, after deformation, the triangular elements 71 in a first strip between two parallel crack lines are lying in a flat plane that makes an angle of +10° with respect to the reference plane, the triangular elements 72 in a second strip between two parallel crack lines are lying in a flat plane that makes an angle of −10° with respect to the reference plane, the triangular elements 73 in a third strip between two parallel crack lines are again lying in a flat plane that makes an angle of +10° with respect to the reference plane, and so on (the definition of the sign of the angle is as follows: the angle α between a first plane and a second plane, that have an intersection line 1, is defined as being positive, i.e. +α°, if the first plane has to be rotated in the counter-clockwise direction around the intersection line 1 for an angle of α° to coincide with the second plane).

To obtain the reorientation, the laminate can e.g. be pressed in a mould at a temperature above the glass transitional temperatures $T_g$ of the organic resin layers, as described above. The application based on deformation of the laminate, described above, is mainly concerned with deformation of the laminate at a macroscale, whereas reorientation of the pattern elements in the laminate occurs at a micro-scale. Reorientation is possible because the hard glass pattern elements are embedded in a soft matrix of e.g. organic resin, that is present in the crack lines of the glass layer and/or in the other layers of the laminate. Because of this soft matrix, the form of the laminate can adapt to the imposed reorientation.

Reorientation is not limited to the example described above. Reorientation can occur for other patterns than a triangular pattern. Reorientation in three dimensions is possible, so that the pattern elements are reoriented along three, four or more arbitrary planes. Only part of the pattern elements may be reoriented, while other pattern elements retain their original orientation.

An advantage of a laminate having a glass layer with reoriented pattern elements is that the structure of the pattern elements may be clearly visible. The structure of the pattern elements may be a very fine structure, comparable e.g. to a rosette structure (in the field of printing, a rosette structure is a well known screening artefact that may be present in the print). The structure of the pattern elements may e.g. be an extra safety feature in a security card. Another advantage is that the reoriented pattern elements may have mirroring properties. In an embodiment according to the present invention, the laminate comprises a glass layer having reoriented pattern elements and an additional metallic layer, to enhance the mirroring properties. Yet another advantage is that, when the laminate comprises a recording layer, the recording layer may comprise pattern elements that have different orientations. The recording layer may comprise a DRAW-material (Direct Read After Write) as discussed hereinbefore, or another material as described hereinbefore, or another material as known in the art. Because of the different orientations of the pattern elements in the recording layer, the recorded information may be subdivided into portions, all elements within the same portion having the same orientation. This offers e.g. the possibility, as in the case of an optical disc or an optical card, to read and/or write only one or more portion(s) of information at a time. To read a portion having another orientation, the orientation of the reading means may be changed, or the orientation of the recording layer may be changed, or optical means, such as a mirror, may be used in the optical path between the recording layer and the reading and/or writing means.

Another application of a laminate in accordance with the present invention is a chip card, wherein the laminate comprises a recording layer, such as the recording layers mentioned hereinbefore. A disadvantage of prior art chip cards, that are usually made of plastic, is that the recording layer is not well protected from moisture and air, which results in short life of the card. In a preferred embodiment in accordance with the present invention, the laminate comprises a first glass layer at the first side of the recording layer and a second glass layer at the second side of the recording layer, opposite to the first side. This offers the advantage that the recording layer is well shielded from air, moisture, etc. The laminate further comprises a third glass layer having crack lines; this third glass layer may be identical with the first or with the second glass layer, or it may be a distinct layer. Extra advantages of the presence of the crack lines may be, besides the higher flexibility of the card, an extra safety feature, mirroring properties, etc. as mentioned hereinbefore. Preferably, the two glass layers protecting the recording layer have no crack lines or, more preferably, said two glass layers have crack lines with zero width and/or with a depth smaller than the glass layer thickness; in this way, the recording layer is well shielded by glass.

Yet another application of a laminate in accordance with the present invention is the production of photomasks, that can e.g. be used to manufacture printed circuit boards, semiconductor devices, integrated circuits, as known in the art. Prior art masks having a polymer support suffer from insufficient dimensional stability, due to environmental changes in temperature and/or humidity. A glass layer support provides the important advantage of a high dimensional stability. The imaging layer, which may comprise a light sensitive material such as a silver halide photographic material, may be coated on the glass support as described hereinbefore. A disadvantage of a laminate comprising a glass layer without crack lines, however, is the risk of breakage due to the low flexibility of the glass layer.

A laminate comprising a glass layer having crack lines has the advantages of a high flexibility, a high dimensional stability, and good optical properties. In fact, for a laminate comprising a glass layer having crack lines and one or more polymer layers, the dimensional stability of the laminate with respect to changes in temperature and/or humidity is determined by the properties of the glass layer and not by the properties of the polymer layer(s).

Suppose, for example, that the laminate comprises a glass layer 10 between two polymer layers 20 and 30 as shown in FIG. 2. The polymer layer 30 is adhered to the glass layer 10 over the complete surface D, except for the surface of the crack lines. Therefore, in case of e.g. a rise in temperature, the polymer layer 30 can expand thermally only together with the glass, in all portions where the polymer contacts glass; only the small portions of the polymer layer 30 at the position of the crack lines 11 can expand freely. Since the width of the crack lines is preferably only a fraction of the size of the pattern elements in the glass layer (the width may even be zero), the thermal expansion of the polymer layer 30 nearly equals the thermal expansion of the glass. The thermal expansion coefficient of glass is an order of magnitude smaller than the thermal expansion coefficient of polymers. For the same reason, the dimensional stability of the laminate with respect to a change in humidity is also determined by the properties of the glass layer.

Good optical properties of the laminate can be obtained by using one or more glass layers with zero crack line width and/or by matching the refractive indices of the polymers to the refractive indices of the glass layers, as explained above.

Still another application is a laminate comprising a medium, e.g. a liquid or a gaseous substance, that may pass through a glass layer having crack lines upon breakage of said glass layer. In a preferred embodiment, the depth of the crack lines is smaller than the glass layer thickness; upon breakage, the crack line depth becomes equal to the glass layer thickness in the area of the break. Such a laminate may e.g. be used as an impact sensor: when the stress in the laminate exceeds a limiting value, e.g. when a limiting bending stress value is exceeded, a break in the glass layer having crack lines is formed. Because of the break, a contact is established between a first layer at a first side of said glass layer and a second layer at the second side of said glass layer, opposite to the first side. The first layer comprises the above mentioned medium, that may pass through the break in the glass layer to the second layer, and effectuate a detectable change in the second layer, as exemplified below. In case of an impact sensor, the detectable change reveals upon inspection of the sensor that the limiting stress value was exceeded.

In a first embodiment in accordance with the present invention, said first layer comprises a first chemical substance and said second layer comprises a second chemical substance; upon contact of the first layer and the second layer, a chemical reaction between the first substance and the second substance takes place. The detectable change caused by the chemical reaction may involve a colour change; for example, the first chemical substance may be a leucodye, as known in the art of colour development, and the second chemical substance may be a reducing agent. The first chemical substance and/or the second chemical substance may be completely enclosed by glass in the laminate. Instead of being fluid, the first and/or the second chemical substance may be gaseous or solid. The laminate may be transparent.

In a second embodiment in accordance with the present invention, the laminate is opaque, e.g. because of an opaque layer that is adhered to the glass layer having crack lines and that may e.g. comprise black pigmented polyethylene. Upon breakage of the glass layer, a medium may pass through the glass layer and through the opaque layer and become visible. The laminate may e.g. comprise a coloured substance in a first layer at a first side of said glass layer, that after breakage becomes visible in a second layer at the second side of said glass layer, opposite to the first side.

In a third embodiment in accordance with the present invention, an electrical connection is established by the breakage of the glass layer. The laminate may comprise a first electrical contact in a first layer at a first side of said glass layer, and a second electrical contact in a second layer at the second side of said glass layer, opposite to the first side. The first layer may comprise an electrically conductive substance, e.g. an electrolyte, such as an aqueous solution of a salt, that may pass through the glass layer upon breakage, thereby establishing an electrical connection between the first and the second electrical contact. An advantage of a laminate comprising a medium that may pass through the glass layer upon breakage is the small thickness of the laminate. In case of restricted available space, the laminate can still be mounted where various prior art impact sensors are too large. Another advantage is that the limiting stress value, upon which breakage occurs, can be controlled by changing the ratio of the crack line depth to the glass layer thickness (a smaller ratio corresponds to a larger limiting stress value). Still another advantage is that breakage occurs in a controlled way, i.e. along crack lines. A drawback of a laminate having glass layers without crack lines is that breakage will occur in an uncontrolled way, and that breakage may even take place in another layer, e.g. in another glass layer in the laminate than in the intended glass layer, so that the detectable change in the laminate may not occur. Yet another advantage of some embodiments in accordance with the invention, such as the embodiment in which an electrical connection is established by the breakage of the glass layer, is that breakage may be detected automatically.

EXAMPLE

The following example illustrates a security card comprising a laminate in accordance with the present invention.
Card shape:
  rectangle with rounded corners,
  length×width: 85 mm×54 mm,
  corner radius: 3 mm,
Card density: mean physical density: 1600 kg/m$^3$
Card thickness: 0.76 mm
Layers: the card comprises the following layers, ordered from one outer surface of the card to the opposite outer surface:
  poly(tethylene terephtalate) layer, thickness 100 µm;
  polyethylene layer, thickness 30 µm;
  borosilicate glass layer, thickness 70 µm;
  imaging layer: diffusion transfer reversal (DTR) layer;
  polyvinylchloride layer, thickness 360 µm;
  borosilicate glass layer, thickness 70 µm;
  polyethylene layer, thickness 30 µm;
  poly(ethylene terephtalate) layer, thickness 100 µm;
Glass layers:
  physical density: 2720 kg/m$^3$;
  pattern of crack lines: straight lines, parallel to the short (54 mm) side of the card, and spaced 1 mm apart.

The mean physical density of the security card is 1600 kg/m$^3$, whereas the mean physical density would be less than 1400 kg/m$^3$ if the glass were replaced by polyvinylchloride. Since the glass layers are thin (only 70 µm), their thickness can still be increased, thereby increasing the mean physical density of the card.

Having described in detail preferred embodiments of the current invention, it will now be apparent to those skilled in the art that numerous modifications can be made therein without departing from the scope of the invention as defined in the appending claims.

PARTS LIST 10 glass layer
11 crack lines
20 second layer
21 surface
24 surface
30 third layer
40 glass layer
41 crack lines
50 laminate
60 pattern
61 pattern element
62 side
63 side
64 axis
65 axis
71 pattern elements
72 pattern elements
73 pattern elements

What is claimed is:

1. A flexible laminate comprising a first layer and a second layer, the first layer being a glass layer having crack lines, a set of the crack lines forming a pattern, the crack lines enclosing a pattern element and the pattern element having a pattern element size equal to the square root of the ratio of the area of the pattern element and $\pi$.

2. The laminate according to claim 1, wherein the crack lines have a depth that is equal to the glass layer thickness.

3. The laminate according to claim 1 wherein the glass layer has a thickness not higher than 1.2 mm and the second layer is selected from the group consisting of paper, metal and an organic resin.

4. The laminate according to claim 2 wherein the glass layer has a thickness not higher than 1.2 mm and the second layer is selected from the group consisting of paper, metal and an organic resin.

5. The laminate according to claim 1, further comprising a third layer selected from the group consisting of paper, metal and an organic resin.

6. The laminate according to claim 1, further comprising a second glass layer.

7. The laminate according to claim 6 wherein said second glass layer has crack lines.

8. The laminate according to claim 1, further comprising a functional layer, for making a photomask.

9. The laminate according to claim 1, wherein the first layer has a failure stress under tensile stress higher than $1 \times 10^7$ Pa.

10. The laminate according to claim 1, wherein the first layer has an elasticity modulus lower than $1 \times 10^{11}$ Pa.

11. The laminate according to claim 1, wherein the first layer has a thickness lower than 0.5 mm.

12. The laminate according to claim 1, wherein the first layer has a thickness lower than 120 µm.

13. The laminate according to claim 1, wherein the first layer comprises a number of portions having crack lines and a number of portions having no crack lines.

14. The laminate according to claim 13, wherein the laminate has a maximum element size which is a maximum pattern element size of the portions of the glass layer having crack lines and is smaller than 5 mm.

15. The laminate according to claim 13, wherein the laminate has a maximum element size which is a maximum pattern element size of the portions of the glass layer having crack lines and is smaller than 1 mm.

16. The laminate according to claim 13, wherein the laminate has a maximum element size which is a maximum element size of the portions of the glass layer having crack lines and is smaller than 0.5 mm.

17. The laminate according to claim 1, wherein at least one pattern element is selected from the group consisting of an arbitrary pattern, a hexagon, square, a cross, a triangle, an octahedron, a diamond, a rectangle, an arbitrary shape, and a four-sided shape with curved sides and broken lines.

18. The laminate according to claim 1, wherein at least one pattern is selected from the group consisting of an arbitrary pattern, a diamond pattern, an octagon pattern, a hexagonal pattern, a rectangular pattern, a brick-like pattern and a triangular pattern.

* * * * *